United States Patent

[11] 3,599,401

| [72] | Inventors | Theodore A. Rich<br>Scotia;<br>James N. Grooves, Schenectady, both of, N.Y. |
|---|---|---|
| [21] | Appl. No. | 533,888 |
| [22] | Filed | Mar. 14, 1966 |
| [45] | Patented | Aug. 17, 1971 |
| [73] | Assignee | General Electric Company |

[54] AIR FILTER SYSTEM
1 Claim, 7 Drawing Figs.

[52] U.S. Cl. .................................................. 55/471, 55/482, 417/436, 417/481
[51] Int. Cl. ................................................. B01d 46/44
[50] Field of Search........................................... 55/267—
—269, 180, 181, 390, 387—389, 467—469 AC,
417, 471, 303, 482; 230/172; 98/110—113, 121,
33; 62/262; 60/62.5, 62.6; 417/436, 481

[56] References Cited
UNITED STATES PATENTS

| 615,668 | 12/1898 | Barr | 60/62.5 |
|---|---|---|---|
| 837,091 | 11/1906 | Melichar | 55/469 |
| 1,024,267 | 4/1912 | Lindenberg | 55/469 |
| 2,216,420 | 10/1940 | Rose | 98/121 |
| 2,293,065 | 8/1942 | Kiczales | 98/110 |
| 2,451,227 | 10/1948 | Krause | 55/417 |
| 2,498,661 | 2/1950 | Dybvig | 62/262 |
| 2,602,878 | 7/1952 | Holody | 55/267 |
| 3,088,456 | 5/1963 | Stanton | 60/62.6 |
| 3,121,625 | 2/1964 | Broughton | 55/58 |
| 3,286,732 | 11/1966 | Alley | 98/110 |
| 2,990,238 | 6/1961 | Kabisch et al. | 210/411 |
| 3,281,065 | 10/1966 | Chaffiotte | 230/159 |

FOREIGN PATENTS

| 812,501 | 4/1959 | Great Britain | 55/277 |

Primary Examiner—Frank W. Lutter
Assistant Examiner—Bernard Nozick
Attorneys—Richard R. Brainard, Paul A. Frank, Charles T. Watts, Charles W. Helzer, Frank L. Neuhauser, Melvin M. Goldenberg and Oscar B. Waddell ABSTRACT: Apparatus is disclosed which comprises an air filter which closes at least one side of an expansible chamber. The effective volume of the chamber is constantly and cyclically varied between a maximum and a minimum by a movable wall member whereby air is drawn through the filter into the chamber and then expelled through the same filter to provide a double-filtering action.

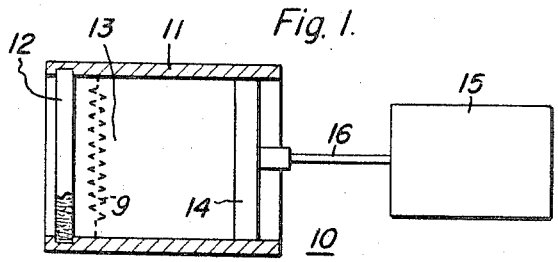
Fig. 1.
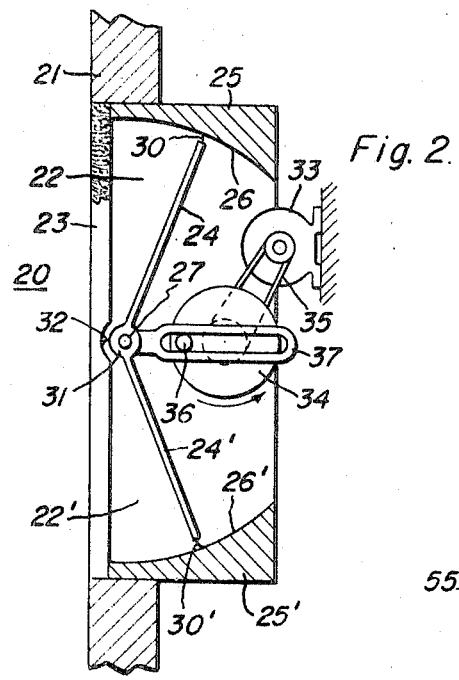
Fig. 2.
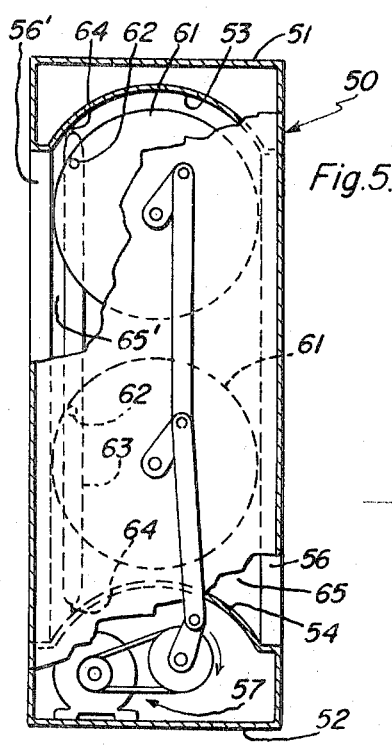
Fig. 5.
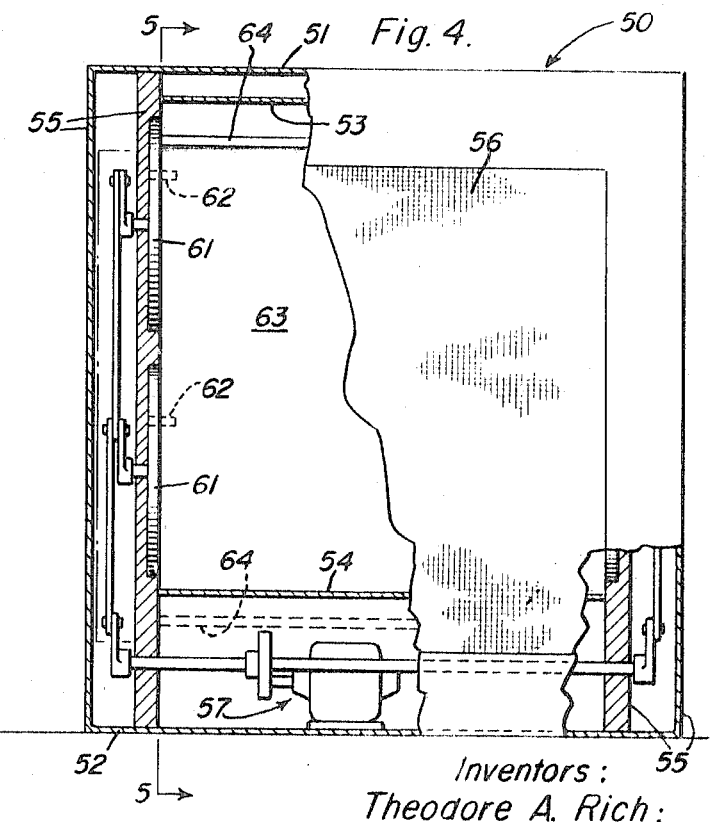
Fig. 3.
Fig. 4.
Inventors:
Theodore A. Rich;
James N. Groves,
by Charles W. Helzer
Their Attorney.

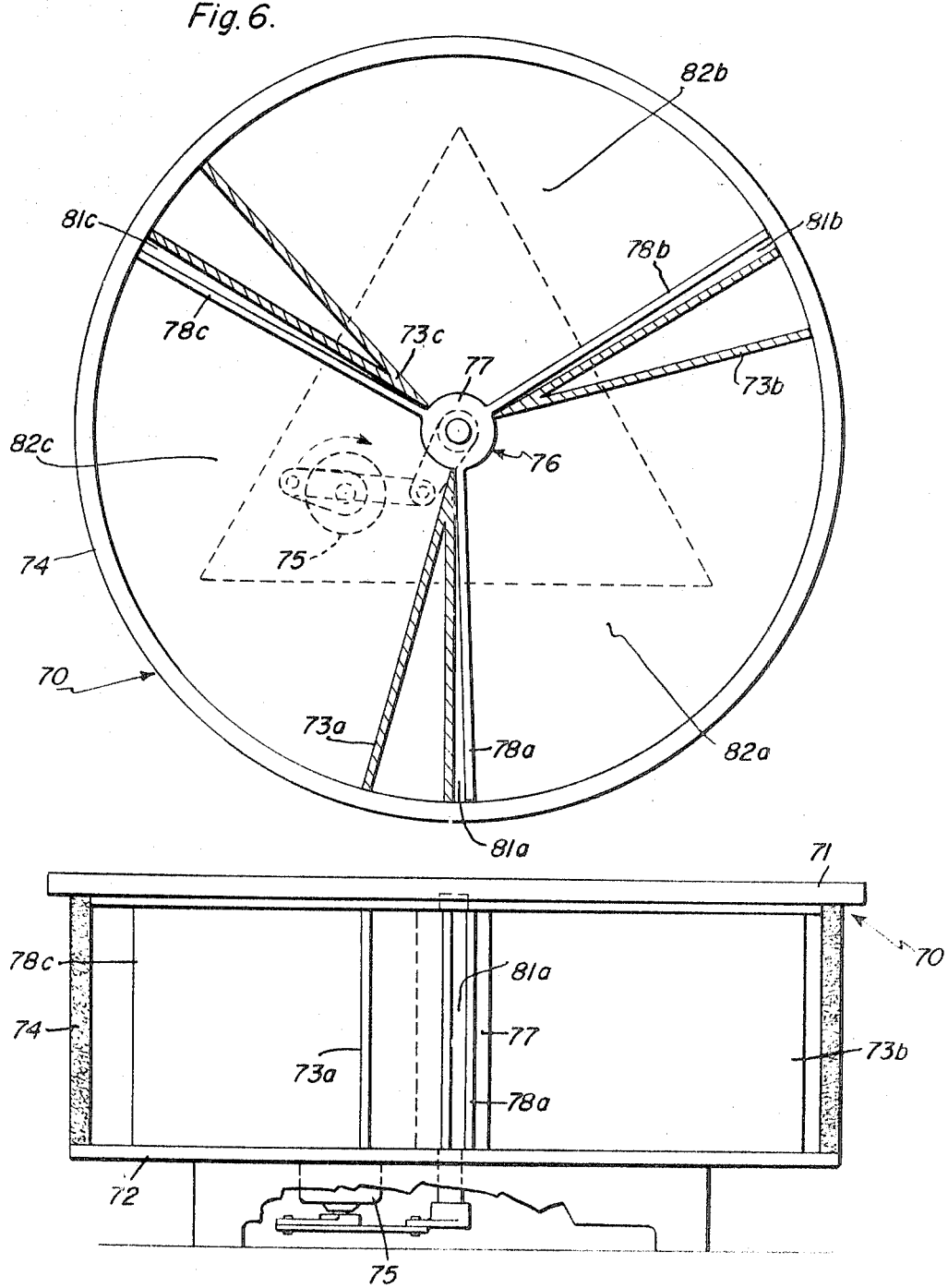

AIR FILTER SYSTEM

This invention generally relates to air filtering systems and, more specifically, to air filtering systems which are useful when separate air circulating means are not available.

In order to fully appreciate the advantages of this invention, a basic parameter by which any filtering system should be rated, the effectiveness of the system should be understood. Effectiveness can be defined as the ratio of the number of particles per unit volume of air in a given situation without a filter to the number of particles in a unit volume of air with the filter in use. This parameter can be determined mathematically for a given structure such as a building having a volume ($V$) wherein air leakage into and from the building occurs at a determinable rate ($I$). The number of particles ($N$) per unit volume in the building at any time is dependent upon the air flow volume per unit of time through a filtering system ($Q$), the average efficiency ($e$) of the air filter, the number of particles ($N_o$), per unit volume in the outside air and the number of particles ($P$) produced per unit of time within the building. Assuming that at a time $t=0$, $N=N_1$, it can be seen that during the period from $t_c$ to $t_1$, or ($\Delta t$), the number of particles in the building is:

$$(1) \quad VN = VN_1 + IN_o\Delta t + P\Delta t - IN\Delta t - eQN\Delta t$$

which is equivalent to $$(2) \quad N = \frac{e^{\left[\frac{(I+eQ)t}{V}\right]} \cdot \left[(I+eQ)N_1 - IN_o - P\right] + IN_o + P}{I+eQ}$$

at a steady state condition, the exponential term approaches $$(3) \quad N = (IN_o + P)/(I + eQ)$$

Effectiveness ($E$) can then be calculated as $$(4) \quad E = \left(\frac{IN_o + P}{I}\right)\left(\frac{I+eQ}{IN_o + P}\right) = 1 + \frac{eQ}{I}$$

In terms of numbers of air changes per unit time through the filter ($q$) and the number of air changes per unit time caused by leakage ($i$)

$$(5) \quad E = 1 + (eq)/(i)$$

Equation (5) therefore shows that three factors must be considered in analyzing any air filtering system: filter efficiency, rate of flow through the filter and leakage air flow. In hot air furnaces, effective air filtering is obtained by increasing air flow through a filter disposed adjacent the furnace. As this type of furnace is normally located remotely from living areas, objectionably inherent noise can be tolerated. When other types of heating systems are used, however, air circulation means are generally not available so some means of air circulation must be provided if an effective filter system is to be obtained. In considering such a filtering system for home use, it must be remembered that high air flow rates not only cause noise but also drafts and a loss of filter efficiency in normal room air.

Therefore, it is an object of this invention to provide a filtering system which operates with a high degree of effectiveness.

Another object of this invention is to provide a highly effective air filtering system wherein drafts and noises caused by high air circulation rates are substantially eliminated.

Still another object of this invention is to provide a highly effective air filtering system wherein the filters are operated at substantially higher efficiency conditions.

In addition to the disadvantage of noises created by high air flows, drafts, and inefficient filtering, prior art air filtering systems have generally incorporated unidirectional air flow. Such unidirectional air flow systems are thereby limited to a single-filtering action by a filter element so that generally the quantity of removed particles is determined by efficiency of the filter. In such a system, as particles in a quantity of air pass through the filter, they stick to the filter with an adhesive force which is much greater than the forces exerted by the moving air stream tending to dislodge the particles. As it is difficult to remove these particles once they are stuck to the filter, they are effectively removed from the air stream. However, if the same air were recirculated through the filter in reverse direction then additional particles could be caught by the filter to thereby improve the overall filter efficiency.

Therefore, it is another object of this invention to provide a highly effective air filtering system which minimizes the particles carried in a volume of air by subjecting the air to filtering action a multiplicity of times.

Prior art systems have also required motors, fans and ducting to move the air. The motors and fans have additionally resulted in increased expense for installation of such a system. Ducting also is expensive and, in addition, is unsightly in a house when a nonforced air heating system is used.

Therefore, still another object of this invention is to provide an air filtering system which does not have an unsightly appearance.

A further object of this invention is to provide an air filtering system which can be incorporated into parts of the building in which the air filtering system is to be used.

Briefly stated, this invention utilizes a filter which closes one side of an expansible chamber. The chamber is also closed by a movable wall which constantly varies the chamber volume between a maximum and minimum. As the volume increases, air is pulled from a space through the filter into the chamber. When the expansible chamber volume decreases, the air is pushed through the filter back into the space to provide a double-filtering action.

This invention is set forth with particularity in the appended claims. The organization, advantages and further objects of the invention may be better understood, however, by reference to the following description of air filtering systems taken in conjunction with the accompanying drawings.

FIG. 1 illustrates a simple air filter system constructed in accordance with this invention, FIG. 2 illustrates an air filter system constructed in accordance with this invention and adapted to be mounted in a supporting structure wall, FIG. 3 illustrates an alternate embodiment of an air filter system constructed in accordance with this invention and adapted to be mounted in a supporting structure wall, FIG. 4 illustrates a perspective view of a room divider which incorporates an air filter system constructed in accordance with this invention, FIG. 5 illustrates an end sectional view along lines 5-5 shown in FIG. 4, FIG. 6 illustrates a top view of a coffee table utilizing an air filter system constructed in accordance with this invention, and FIG. 7 illustrates a side elevation of the coffee table shown in FIG. 6.

FIG. 1 presents an elementary air filter system 10 which can be used to filter air in a building comprising a hollow member 11 which is open at both ends. A filter 12 which is exposed to the space wherein filtering is desired, closes one end of hollow member 11 and forms one wall of an expansible chamber 13. Other boundaries of expansible chamber 13 are constituted by hollow member 11 and by a movable wall or piston 14 which is driven in a reciprocating motion by a reciprocal driving means 15 and linkage 16. Piston 14 matingly engages hollow member 11 to form a sliding seal to thereby limit the escape of air from expansible chamber 13 past peripheral portions of piston 14.

As piston 14 is moved slowly away from the filter 12, the volume of expansible chamber 13 increases; and a pressure differential occurs across filter 12 as known in the art. Air is drawn from the space being treated through filter 12 into expansible chamber 13 during this expanding condition. Similarly, when piston 14 is subsequently advanced toward filter 12, the volume of expansible chamber 13 decreases so that air is forced back out of expansible chamber 13 through filter 12 into the space thus traversing the filter 12 at least twice.

By limiting the air velocity through filter 12 to a velocity approaching the natural air flow caused by air leakage and other factors in the building and by using this structure of an air filter system, several advantages are obtained. Low air velocity permits filter 12 to operate at a high level of efficiency and thereby tends to increase the effectiveness of air filter system 10. In addition air noise and drafts are minimized. The volume of air initially filtered as it enters expansible chamber 13, is filtered a second time when it is exhausted from expansible chamber 13. Thus, double filtering is provided to increase the overall efficiency of filter 12 and the effectiveness of air filter system 10. Such an air filter system is also highly effective because of the rate of air change caused by the double filtering can be maintained at a high rate merely by increasing the area of the filter.

In order to obtain large filter areas to provide a highly effective filter, it is contemplated that air filter systems utilizing this invention will be incorporated in building walls, in room dividers other than walls or in articles of furniture. Therefore, the following description of the remaining figures is intended to teach alternate embodiments of the invention and their adaption to various supporting and housing structures.

In analyzing these various embodiments of air filter systems, it should be remembered that the air filter, shown diagrammatically as a block and designated by numeral 12 in FIG. 1, can be constituted by any known filter construction. Fiber filters, electrostatic filters and other filters known in the art all can be used with air filter systems incorporating this invention. In addition, this type of filter system facilitates the addition of a heating element as shown at 9 in FIG. 1. For example, where a fiber filter is used, the electrical heating grid 9 could be disposed in juxtaposition with air filter 12 to heat the air as it flowed through filter 12 during alternate increases and decreases of the volume of expansible chamber 13. It will be obvious to those skilled in the art that this modification can be applied to all of the air filter system disclosed hereinafter.

An air filter system 20 adapted to be disposed in an opening in a wall 21 is shown in FIG. 2 and comprises two similar expansible chambers 22 and 22'. Expansible chamber 22 is constituted by a portion of an air filter 23, a movable arm 24 and an end member 25 having a curved surface 26 which is defined by an arc scribed by the end of movable arm 24 as it is pivoted about an axis at a pivot pin 27. In order to minimize air leakage between movable arm 24 and end member 25, a sealing means, such as a flexible wiper seal 30 attached to movable arm 24, can be used. Expansible chamber 22' is similarly defined by another portion of air filter 23, a movable arm 24' and end member 25' and a flexible seal 30' which extends between movable arm 24' and a curved surface 26'. Movable arms 24 and 24' are angularly displaced to each other and are joined to a hub portion 31, and air flow between expansible chambers 22 and 22' is minimized by using a sealing means such as a flexible wiper seal 32 between hub portion 31 and air filter 23.

Movable arms 24 and 24' are oscillated slowly about the axis of rotation formed by pin 27 by an oscillatory drive means such as a mechanical harmonic generator comprising a motor 33 which drives a wheel 34 by a linkage 35. A pin 36 fixedly located on wheel 34 extends in a slotted arm 37 integrally formed to hub portion 31 to angularly displace slide arm 37 as it rotates with wheel 34. Linkage 35, shown simply as a pulley belt, generally would include speed reduction means to reduce the motor speed to a suitable oscillatory rate for movable arms 24 and 24'.

As movable arm 24 is rotated toward filter 23 decreasing the volume of expansible chamber 22 and driving air through filter 23, air is simultaneously forced into expanding expansible chamber 22' through filter 23 as movable arm 24' moves away from filter 23. This air flow pattern continues until a dwell time is reached when expansible chamber 22 reaches a minimum volume and expansible chamber 22' reaches a maximum volume. At this dwell position, air, pushed out of expansible chamber 22, moves away from filter 23 and different air moves adjacent filter 23. This air change occurs primarily as a result of natural air currents caused by temperature gradients within the room. After the dwell time, the direction of rotation reverses and movable arm 24 is displaced from filter 23 thereby drawing air through filter 23 into expansible chamber 22. Simultaneously, the volume of expansible chamber 22' decreases and the air within the expansible chamber 22' is forced back through the filter for a second filtering.

If the area of filter 23 is sufficiently large, as could be easily obtained if the filter forms a substantial portion of a wall, then the speed of oscillation of movable arms 24 and 24' could be very slow. This would limit the air velocities while maintaining a large volume movement and, therefore, a high-volume rate of change of the filtered air.

Still another filtering system which provides filtering for large volumes of air at relatively slow air velocities is shown in FIG. 3. The air filter system 40 is also shown as being disposed as a part of a wall 41 with a plurality of expansible chambers 42 being formed by a plurality of moving arms 43 which are each oscillated about an associated pivot 44 by an oscillatory driving means 45 shown in outline form. Each moving arm 43 and its associated pivot 44 are located adjacent a filter 46; and each expansible chamber 42 is constituted by a section of filter 46, movable arm 43, end members 47 and sealing means 48 between movable arm 43 and end member 47 and between movable arm 43 and filter 46.

Each movable arm 43 oscillates about a pivot 44 in the same direction so that air is simultaneously forced into all of the expansible chambers 42 or is simultaneously forced from expansible chambers 42 through filter 46. By utilizing a plurality of movable arms 43, it can be seen that the depth of the filter system would be somewhat less than that shown in FIG. 2 to move the same volume of air at the same velocity. However, the other advantages of the air filter system discussed in detail with reference to FIG. 1 are still applicable to air filter system 40.

FIGS. 4 and 5 illustrate a room divider which incorporates an air filter system constructed in accordance with this invention. The room divider 50 generally comprises a top wall 51 and a bottom wall 52 wherein the top wall 51 has an inner concave surface 53 and the bottom wall 52 has an inner convex portion 54. End walls 55 are disposed between top wall 51 and bottom wall 52 to close that portion of the room divider while the other sidewalls of the room divider 50 are formed by filters 56 and 56'. Bottom wall 52 can be formed so that a driving means 57 can be disposed therein and linked to driving wheels 61 trapped in each end wall 55. Driving means 57 causes driving wheels 61 to undergo oscillatory motion through a limited angular displacement. With such linkage, pins 62 can be fixedly located on driving wheels 61, and a plate 63 can be suspended from pins 62 in a vertical position so that plate 63 remains in a generally vertical plane while driving wheels 61 are oscillated. The concave surface 53 and the convex surface 54 are formed to coincide with the arc defined by the plate 63 as it undergoes this motion from one side of the room divider 50 to the other side. Sealing means 64 can also be disposed between plate 63 and top and bottom walls 53 and 54 to limit air transfer from one side of the plate to the other. In this manner plate 63, top and bottom walls 53 and 54 and filters 56 and 56' form two expansible chambers 65 and 65' which alternately expand and contract as plate 63 is moved.

From the structure shown in FIGS. 4 and 5, it can be seen that plate 63 is reciprocated between filters 56 and 56' to alternately expand and contract expansible chambers 65 and 65'. As plate 63 moves toward filter 56, expansible chamber 65 decreases in volume and air is forced through filter 56 into the room while air is being pulled into expansible chamber 65' through air filter 56'. Similarly, when the driving mechanism causes plate 63 to move toward air filter 56' the air circulation pattern through filters 56 and 56' reverses.

Still another example of an air filter system incorporating this invention is shown in FIGS. 6 and 7 wherein an air filter system is built into an article of furniture such as a coffee table 70. Coffee table 70 generally includes a top 71, a bottom supporting member 72, which is spaced from the floor, and supporting means 73a, 73b and 73c which are equiangularly spaced about the coffee table to support top 71 with respect to bottom supporting member 72. A filter 74 disposed about the circumference of coffee table 71 encloses the volume between top 71 and bottom supporting member 72. A driving means 75 is located within the space formed by bottom supporting member 72 and it is connected to drive a movable arm assembly 76 through a limited oscillatory motion. Movable arm assembly 76 comprises a hub portion 77 which is pivoted at the center of the coffee table and three movable arms 78a, 78b and 78c which extend radially from hub portion 77 and terminate adjacent filter 74. Although flexible sealing means are not shown in these figures, it should be understood that these sealing means can be used. Each of the supporting members 73a, 73b and 73c is constituted by two radially extending angularly displaced walls which form boundaries for a plurality of expansible chambers. Each movable arm constitutes a movable wall for two expansible chambers. For example, movable arm 78a constitutes a movable wall for expansible chambers 81a and 82a. As can be seen from FIG. 6, each expansible chamber 81 is at a minimum volume while each of the expansible chambers 82 is at a maximum volume. However, further motion of driving means 75 causes the movable arm assembly 76 to rotate about the hub portion 77 so that expansible chambers 81 are characterized by an increasing volume while expansible chambers 82 are characterized by a decreasing volume. Air is then pulled through filter 74 into expansible chambers 81 and is forced from expansible chambers 82 through filter 74.

By way of example, if the top 71 were 4 feet in diameter, and the blades were moved so that a blade tip velocity of 1.3 feet per second were obtained, the coffee table pictured in FIGS. 6 and 7 would provide filtering at the rate of 300 cfm. with an air velocity at the filter of approximately 0.3 fps. This then would give adequate volume changes for a particular area while maintaining an air velocity which was relatively low and which would approach both the velocity at which the air filter efficiency would be at a maximum and the velocity compatible with the natural velocity of air currents caused by convection, thermal gradients and other factors in the area in which the coffee table was set.

Briefly summarizing, the air filter system which is constructed in accordance with this invention includes an expansible chamber which is mounted behind an air filter so that air enters or leaves the expansible chamber through the filter. Means are provided to alternately expand and contract the expansible chamber to thereby provide a double filtering action of the air. As described above, this particular arrangement of a filtering system can be housed in many areas normally encountered in a building structure such as the walls of the structure, room dividers or articles of furniture, Further, an air filter system constructed in accordance with this invention operates to filter large volumes of air at relatively slow velocities to thereby provide a highly effective filter which does not have drafts and air noises encountered in filter systems associated therewith.

Having described particular embodiments of an air filter system, it is believed obvious that other modifications and variations of the invention, such as different structures for expansible chambers, different filters or different supporting structures are possible in light of the above teachings. It is therefore to be understood that changes may be made in the particular embodiments of the invention described which are within the full and intended scope of the invention as defined by the appended claims.

We claim:
1. An air filter system for circulating and filtering the air in a room comprising:
   a. support means including a plurality of walls defining an open-sided structure,
   b. air filter means mounted on said support means to close said support means to define an air space,
   c. means mounted on said support means for forming an expansible chamber within the air space for moving air through said filter means into said expansible chamber and exhausting air through said filter means from said expansible chamber, and
   d. means for alternately expanding and contracting said expansible chamber connected thereto whereby air is alternately pulled into said expansible chamber and exhausted from said expansible chamber through said filter means to subject the air to double filtering, said support means comprising a room divider having spaced sidewalls, a base having a convex upper surface between said sidewalls and a top having a concave lower surface between said sidewalls, said air filter means comprising first and second air filters mounted on said support means to completely enclose said support means, driving means including oscillating plates rotatably mounted to each of said spaced sidewalls and said expansible chamber includes a movable plate means suspended from said oscillating plates substantially parallel to said air filters for displacement between said first and second air filters, said concave and convex surfaces being formed to substantially close said expansible chambers formed between said first air filter and said plate means and between said second air filter and said plate means.